(12) United States Patent
Baker

(10) Patent No.: US 6,280,199 B1
(45) Date of Patent: Aug. 28, 2001

(54) ANTIBODY TEACHING AID

(76) Inventor: William P. Baker, 11275 N. 99th Ave., #63, Peoria, AZ (US) 85345

( * ) Notice: Subject to any disclaimer, the term of this patent is extended or adjusted under 35 U.S.C. 154(b) by 0 days.

(21) Appl. No.: 09/493,417

(22) Filed: Jan. 29, 2000

Related U.S. Application Data

(60) Provisional application No. 60/117,956, filed on Jan. 30, 1999, now abandoned.

(51) Int. Cl.[7] .................................................. G09B 23/00
(52) U.S. Cl. ........................................ 434/295; 434/276
(58) Field of Search ................................. 434/150, 277, 434/278, 279, 280, 295, 406, 276

(56) References Cited

U.S. PATENT DOCUMENTS

| | | | |
|---|---|---|---|
| 2,140,103 | * 12/1938 | Bryan | 434/280 |
| 4,031,635 | * 6/1977 | Brandt et al. | 434/295 |
| 5,123,846 | * 6/1992 | Lewis | 434/150 |
| 5,149,098 | * 9/1992 | Bianchi | 434/406 |
| 5,743,741 | * 4/1998 | Fife | 434/406 |

* cited by examiner

*Primary Examiner*—Sam Rimell
(74) *Attorney, Agent, or Firm*—Barry L. Copeland

(57) ABSTRACT

A teaching aid for use in facilitating the study and understanding of antibodies and antigens is disclosed. The teaching aid comprises models demonstrating how the variable regions of both the light and heavy chains of the antibody protein permit both the diversity and the selectivity of these biomolecules. Teaching methods utilizing the inventive teaching aid are also disclosed.

7 Claims, 3 Drawing Sheets

ANTIBODY TEACHING AID

CROSS REFERENCE TO RELATED APPLICATIONS

This application draws priority from U.S. Provisional App. Ser. No. 60/117,956 filed Jan. 30, 1999, now abandoned.

BACKGROUND OF THE INVENTION

The present invention relates to the field of teaching aids, and provides a kit for use in an educational exercise. More specifically, the present invention provides a kit that will aid in teaching students about antibodies through a hands-on classroom or laboratory exercise.

Antibodies are studied in courses on immunology, and numerous texts on the subject are available. See, e.g., Abbas et al., *Cellular and molecular immunology $2^{nd}$ ed.,* (New York: W. B. Sanders)(1994); and Benjamini & Leskowitz, *Immunology, a short course, second edition,* (New York: Wiley-Liss)(1992). Student laboratory experiments and exercises associated with such courses, however, tend to be somewhat limited. This is perhaps due in part to the obvious risks associated with exposing students to the types of pathogens that would be appropriate subjects of study.

Antibodies are proteins produced by an animal's immune system to defend the body against damage from foreign matter that has somehow been introduced into the tissue or bloodstream of the animal. When the body is invaded by a foreign agent—whether it is microbial, a chemical substance, or a larger structure such as dust or a pollen grain—one of the most powerful biological mechanisms for eliminating it is through the production of an antibody. The antibody is a protein that recognizes a specific stereochemical molecular shape borne by the invader (termed an antigen, which is taken from ANTIbody GENerating molecule). The antigenic site may be an entire molecule, a part of a molecule or structure, or a partially degraded by-product of the invader.

Antibodies belong to a class of proteins called immunoglobulins (abbreviated Ig). There are five subclasses of structurally distinct immunoglobulins: IgG, IgA, IgM, IgD, and IgE. In humans, these five subclasses account for literally millions, perhaps even billions of different antibodies to defend against virtually any antigens our bodies might encounter. The specificity of each antibody comes from its unique amino-acid sequence. However, it would place an impossible burden on our genomes to carry all the genes necessary to code for this multitude of proteins. In fact, research has shown that only a small number of human genes actually code for the immunoglobulins. How the human body is capable of generating such a large number of different proteins from a relatively small number of genes is now being resolved at the molecular level.

Several teaching aids and educational games have been developed for use by students to learn about various aspects of immunology or immunology-related disorders such as AIDS. U.S. Pat. Nos. 5,215,309 and 4,121,823 disclose board games designed to educate the players concerning immune responses or the lack thereof and associated diseases. Neither of these, however, focus on the structure/ function relationship of antibodies and antigens at the molecular level, nor do they provide tools for hands-on experimentation by the students. U.S. Pat. No. 5,556,100 discloses another board game and describes fixed-shape, three dimensional lymphocyte cards and antigens that are designed to physically interlock; the creation of the shape of the antibody, however, is not a part of the game. Other known teaching aids related to antibodies do provide a hands-on approach. One involves students grabbing different color balloons to demonstrate the antibody/antigen affinity. See, Scott, *Using Balloons to Teach Immunology,* published by the American Association of Immunologists at http://www.scienceXchange.com/aai/educating/using.htm. Another uses styrofoam spheres and VELCRO® pieces in shoe boxes to demonstrate the antibody/antigen binding phenomenon. See, Burtson, *Antibody Capture Simulation,* (1995) published by the American Association of Immunologists at http://www.scienceXchange.com/aai/ committees/education/antibody.htm. Once again, these aids provide little detail relative to the structure and substructures of antibodies at the molecular level. O,Kennedy, *A simple model system to demonstrate antibody structure and function,* J. of Biological Education, 25(1):5 (1991), discloses a model system utilizing flexible tubing and bolts to demonstrate antibody structure, but does not include any components representative of antigens or the antibody/ antigen complex. Baker et al., *A Simple ELISA Exercise for Undergraduate Biology,* Educational Resources Information Center, U.S. Dept. of Education, No. ED 396952 (1996), discloses a model to demonstrate the Enzyme Linked Immuno Sorbent Assay (ELISA), but such model does not include components representative of the four interconnected polypeptide chains of the antibody nor does it permit their rearrangement to demonstrate antibody diversity. Teaching aids that are designed to simulate the molecular bonding of nucleotides or base pairs in the formation of DNA are marketed. See, e.g., *DNA Model Kit,* by KD Biographics, San Diego, Calif.; and *Chromosome Simulation Biokit,* by Carolina Biological Supply Company, Burlington, N.C. These products, however, deal with DNA, a nucleic acid that is structurally and chemically quite different from antibody proteins which are the subject matter of the teaching aid of the present invention. There is a need, therefore, for a hands-on teaching aid to reinforce lecture and textbook teaching on the subject of antibody molecular structure and function.

SUMMARY OF THE INVENTION

The present invention relates to a molecular modeling kit that is used to teach students about immunology, and specifically about the structural/functional relationship between antibodies and antigens. The kit comprises pieces that represent possible parts of the antibody molecule, and additional pieces that represent possible antigens with variously shaped binding sites. The exercise involves piecing together the antibody pieces to create a model of a specific antibody, and seeing which, if any, of the antigen pieces possess a binding site that would match the antibody just pieced together. In this manner, the student is taught to appreciate the molecular diversity of antibodies and the critical role that such diversity plays in the antigen binding process.

BRIEF DESCRIPTION OF THE DRAWINGS

The following drawings form part of the present specification and are intended to further demonstrate certain aspects of the present invention. The invention may be better understood by referring to the drawings while reviewing the specific embodiments described in the detailed description below.

FIG. 1A represents the Constant Regions including a Common Fragment (FC); a pair of Heavy Chains (HC); and a pair of Light Chains (LC). FIG. 1B represents two pairs of Heavy Chain Variable Regions (HV). FIG. 1C represents three pairs of Light Chain Variable Regions (LV).

DETAILED DESCRIPTION OF THE INVENTION

Antibodies are composed of four interconnected polypeptide chains—two pairs of identical subunits: Two longer, higher molecular weight heavy chains are joined to two shorter, light (i.e. lower molecular weight) chains. These four chains are believed to be arranged roughly in the form of a Y.

Figure 1A:
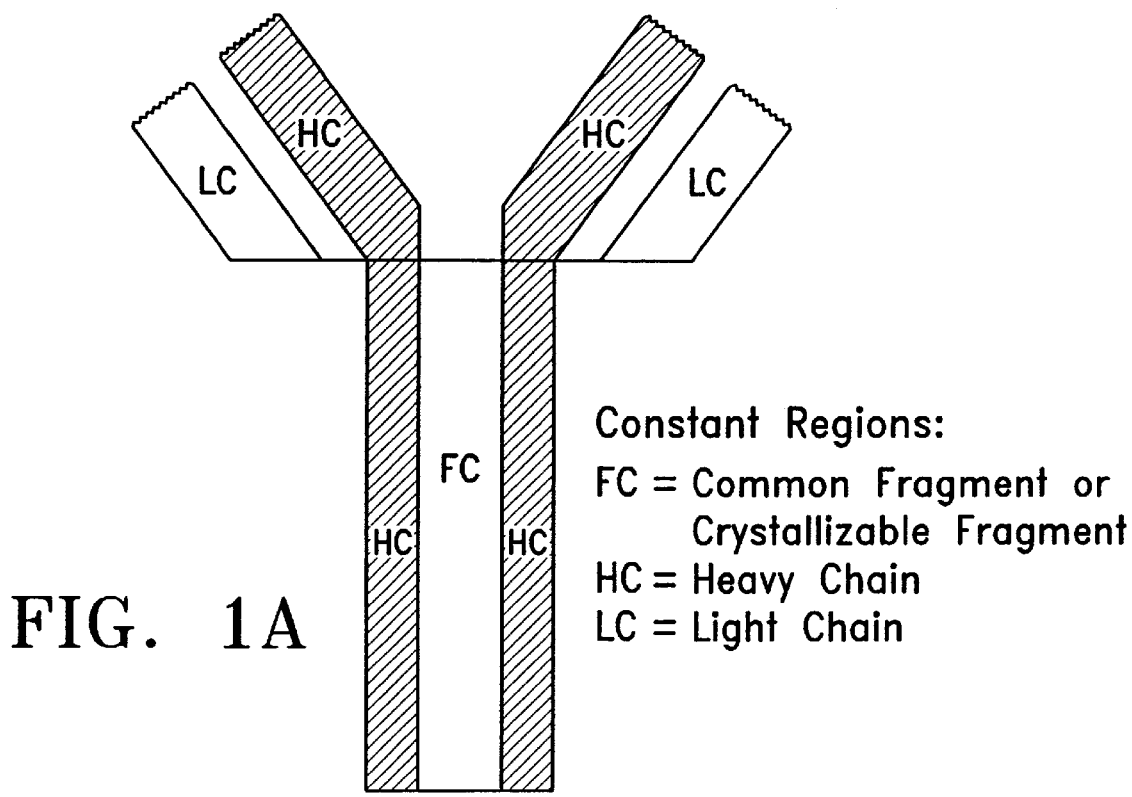
FIG. 1A, FIG. 1B, and FIG. 1C depict the model of the antibody with its various components identified.

The stalk of the Y is often called the crystallizable fragment for historical reasons. For purposes of this application, it is called the "common fragment" (abbreviated FC) as depicted in FIG 1A. The light and heavy polypeptide chains are bound together by molecular connections called disulfide bridges, which are not shown in the figures.

Analysis of amino-acid sequences and the comparison of different antibodies has revealed that there are large areas of the heavy and light chains that are similar in all known human antibodies. As depicted in FIG 1A, these areas are called "constant regions" in the model. There are Heavy chain constant regions (abbreviated HC) and light chain constant regions (abbreviated LC).

Figure 1B:
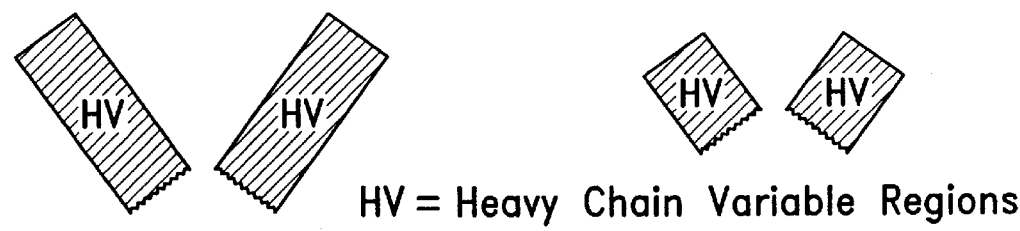
Figure 1C:
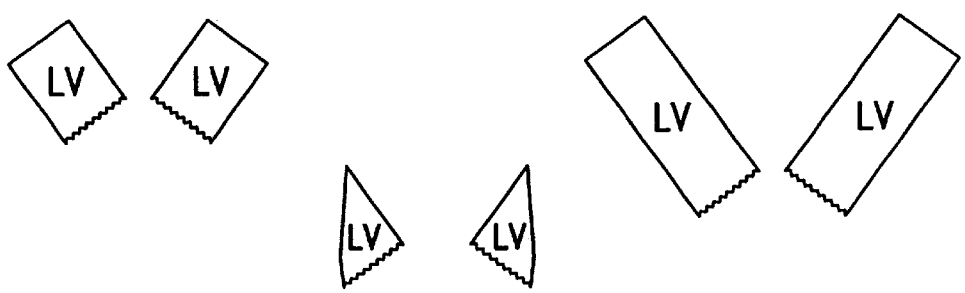
Figure 2A:
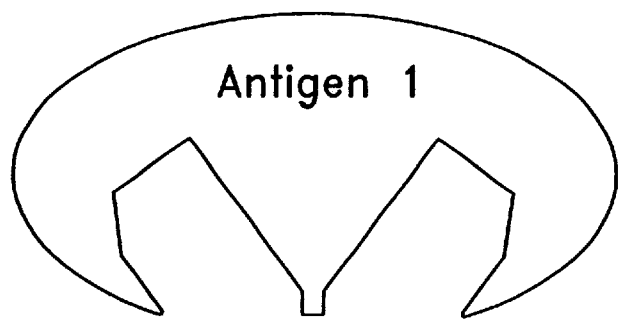
FIG. 2A, FIG. 2B, FIG. 2C, and FIG. 2D depict the shapes of antigens with binding sites corresponding to antibody configurations which may be made by properly assembling the components of FIG. 1.
Figure 2B:
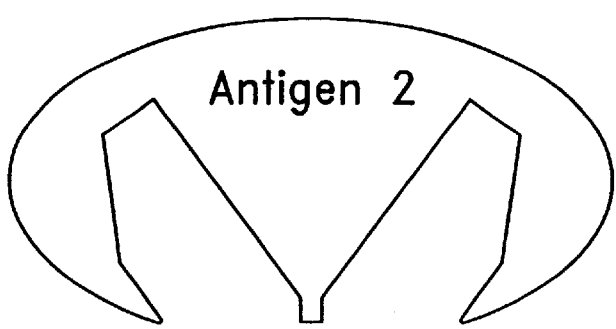
Figure 2C:
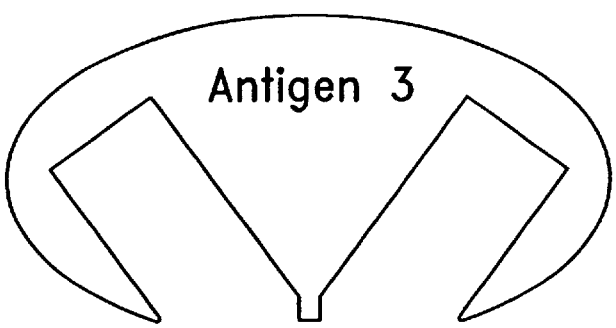
Figure 2D:
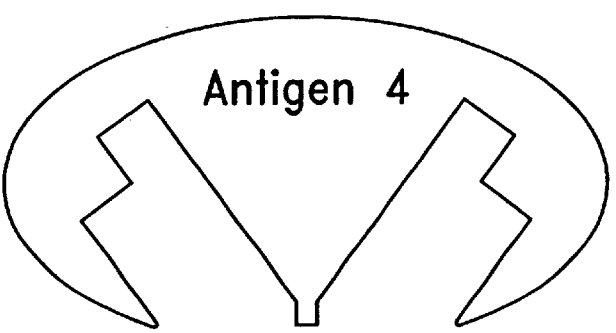

For antigen binding purposes, the critical region of the antibody (referred to hereinafter as the "binding region")is at the top of the Y. Each antibody has a unique amino-acid sequence in this region termed the variable domain or region. As depicted in FIGS. 1B and 1C, there are variable regions of the heavy chain pair (heavy chain variable regions abbreviated HV) and variable regions of the light chain pair (light chain variable regions abbreviated LV). The heavy and light chain variable regions of an antibody make up its binding region and determine the stereochemical shapes that are responsible for antibody specificity.

The binding region of each antibody molecule actually comprises 2 antigen binding sites on it: the top of each side of the Y. Thus, a single antibody molecule can bind two small viruses or two small antigens on the surface of one larger invader like a large virus, bacteria, or parasite etc. The particular embodiment of the present invention depicted in the FIGS. 2A–2D demonstrates larger antigens possessing binding sites which correspond to the entire binding region of the antibody, i.e. to both branches of the Y. Those skilled in the art, however, will readily appreciate that a virtually unlimited number of antibody/antigen matching shapes are possible and may be used in the manner described herein. A crucial aspect of the present invention lies in the pieces representing the variable regions (HV and LV)of the antibody, for these are the regions that permit the building of a large number of antibodies from a relatively small pool of variable region pieces.

It is not the purpose of this invention to model details of the recombination occurring at the DNA level that are responsible for the production of the antibody components—but rather to demonstrate the result of this recombination (antibody diversity) and perhaps reinforce the recombination lessons that students have received in lectures and textbooks.

Immunological Response

In humans, the proper functioning of the immune system depends on the existence of B-cells. Immature B-cells appear to be constantly produced by the bone marrow. At one point in this process, they possess antibodies on their cell membrane that serve as receptors for antigens. A B-cell must combine with an antigen in order to persist past this stage. Interaction of an antigen with the B-cell's antibody-receptors at this stage activates the B-cell in what is known as a primary immune response. Only some of the numerous antibodies produced by the body find an antigen and undergo this process. As will be discussed below, this process may be simulated by students using the teaching aid of the present invention.

B-cells that are activated in this way undergo clonal proliferation. They differentiate into numerous mature antibody synthesizing cells that circulate in the blood and lymph. These circulating plasma cells divide and produce antibody that is then secreted. Exposure to a given antigen thus results in large amounts of the specific antibody that can attack the antigen that stimulated it. After the infection, the number of B-cells in circulation drops, but usually never completely disappears. Some B-cells become memory cells. These memory cells continue to circulate and produce antibody at a low rate for a long time (long term immunity). Their purpose is to constantly look for the specific antigen that originally stimulated their production. When it is detected, they respond quickly, attacking it in an effort to prevent the disease.

The binding of antibodies with antigens does not itself destroy the antigens or the pathogenic organisms that contain these antigens. Antibodies, rather, serve to identify the targets for immunological attack and to activate nonspecific immune processes that destroy the invader. Bacteria that are coated with antibodies, for example, are better targets for phagocytosis by white blood cells called neutrophils and macrophages. Immune destruction of bacteria is also promoted by antibody-induced activation of a system of serum proteins known as complement. These non-specific processes are not the subject of the present invention.

The Kit Materials

Figure 3A:
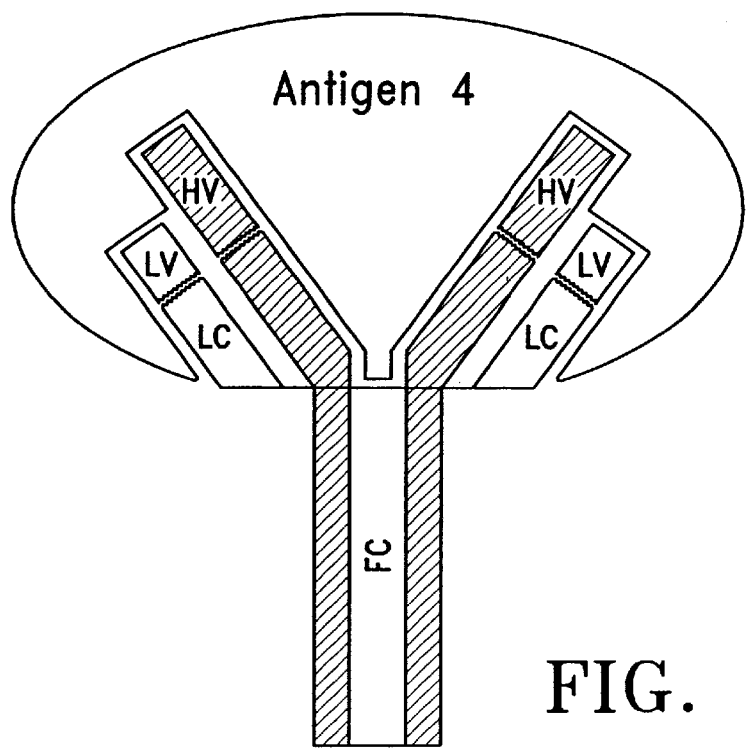
FIG. 3A depicts a completed model of the antigen/antibody complex created using the pieces described in FIGS. 1 and 2.

The teaching aid of the present invention comprises models for an antibody and an antigen, wherein the antibody possesses a constant region and a variable region, which variable region may be fitted with a plurality of different shapes to create a variety of antibodies having differently shaped binding regions; and wherein the antigen comprises a binding site corresponding to the binding region (including one of the individual binding sites thereof) of at least one of the variety of antibodies, so as to permit formation of an antibody/antigen complex. See FIG. 3. The antibodies and antigens in the kit are meant to be generic representations, modeling the essential features of antibody/antigen structure and function. The model is preferably a physical model, although virtual models (i.e. computer generated models) are well within the scope of the invention. In the preferred physical embodiment, the teaching aid materials are in the form of a kit suitable for use in a classroom. The kit is comprised of fixed shapes representing i) an antibody's constant regions adapted to be extended by one of a plurality of corresponding antibody variable region pairs, where the individual members of each variable region pair are mirror images of each other and are adapted to extend their corresponding constant regions to form symmetrical (essentially mirror imaged) binding regions; and ii) an antigen having a binding site that corresponds with the binding region of the antibody. The shapes are preferably flat (i.e. essentially two dimensional, having a relatively small and uniform thickness) and may be "pre-cut" or provided as outline forms to be cut out by the teacher or students. Pre-cut shape pieces may be made of metal, plastic, wood, foam rubber or the like. Outline forms of the shapes may be provided with or without perforations on any material that can be readily cut (or torn along perforations), such as paper, preferably light weight cardboard, card stock, or construction paper, light weight plastic, foam rubber or the like.

The following are preferred embodiments of the teaching aid materials of the present invention. It will be appreciated, however, that the inventive model may be practiced using various materials and techniques known to educators without deviating from the principles of the present invention.

The printed outline of the Y-shaped constant regions together with a textual description of the various components thereof, as depicted in FIG. 1A, is provided on card stock or the like. The identified components, especially the heavy and light chain components (HC and LC, respectively) are distinguished by coloration, shading, and/ or labeling with identifying marks such as "HC" and "LC." The edges of the HC and LC at the top of the Y are differentiated (e.g. with serration or some other form of demarcation) from the other edges of the printed outline to suggest the points of attachment of the corresponding variable chains. The printed outlines of multiple variable chain pairs are similarly provided on card stock, as depicted in FIGS. 1B and 1C. The heavy chain variable region will preferably have the same coloration or shading as the HC, but will be labeled with a different identifying mark such as "HV." Likewise, the light chain variable region will preferably have the same coloration or shading as the LC, but will bear a different label, such as "LV." The individual members of each variable chain pair will also have a single differentiated edge, e.g. serrated or otherwise marked, to suggest the point of attachment to the corresponding constant region chains, such that when a selected LV pair is attached to the LC and a selected HV pair is attached to the HC, a symmetrical antibody model is formed. See FIG. 3 showing such a symmetrical antibody complexed with its corresponding antigen. To serve its intended purpose, the kit will contain at least one outline of constant regions, such as that depicted in FIG. 1A. Multiple outlines of constant regions corresponding to some or all of the five structurally distinct subclasses of immunoglobulins would also be useful. Similarly, to serve its intended purpose, the kit will contain at least three variable region pairs, of which at least one is a light chain variable region and at least one is a heavy chain variable region. Preferably, the kit will contain one to three constant regions shapes, and three to ten pairs of variable region shapes (preferably divided relatively equally between LV and HV). In the preferred embodiments depicted in FIG. 1B and 1C, there are two heavy chain variable pairs and three light chain variable pairs.

The printed outline of at least one antigen possessing a binding site that corresponds to the binding region of at least one of the complete antibody shapes that may be made using the constant and variable region shapes described above is also provided on card stock or the like. The binding site of the antigen is preferably an indentation or impression, which, being contoured to match the outline of the binding region of the matching antibody, will serve to physically secure that antibody in place when the two are complexed (see FIG. 3). It is preferred that multiple antigens with differently shaped binding sites be included in the kit. Preferably two to twenty such antigen shapes would be included; and most preferably, four to ten. Four such different antigens are depicted in FIGS. 2A–2D.

The kit will also preferably contain printed instructions on the use of the above described kit components to perform the exercises simulating various aspects of an immune response. The instructions may be on a separate instruction sheet, or may be printed on the card stock containing the antibody/ antigen outlines. The instructions may be directed to the teacher, the students, or both. The kit may optionally contain means for cutting out the aforementioned shapes (such as scissors or other bladed instrument), and further means for attaching the corresponding variable and constant regions, i.e. LV to LC and HV to HC, so as to hold the completed antibody together while searching for the matching antigen. Non-permanent adhesives, such as cellophane tape or adhesive gum are suitable for the latter purpose. Alternatively, the constant and variable regions may be designed to be detachably connected. This may be accomplished with magnetic attraction, or interlocking edges that snap into place, or interlocking edges having a puzzle-type configuration, or edges possessing hooks and/or loops of the VELCRO® type, or any number of other designs which would serve to temporarily hold the corresponding pieces in place.

Figure 3B:
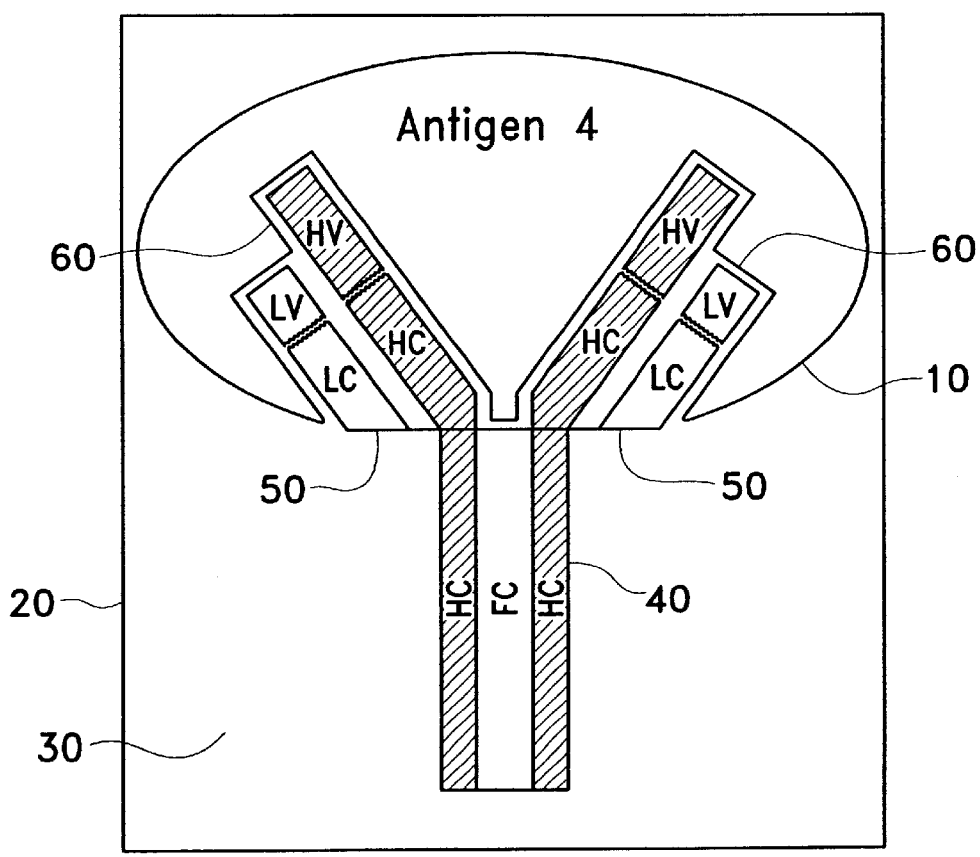
FIG. 3B depicts the antigen/antibody complex of FIG. 3A as created using an alternative embodiment of the invention.

An alternative preferred embodiment is depicted in FIG. 3B. In this embodiment, all of the antibody shapes (the constant regions piece or pieces and each individual member of every variable region pair) are pre-cut, and made of a thin, supple vinyl-type material that will cling to itself or to any flat, smooth, non-porous surface. Referring to the Figure, each antigen shape 10 is depicted on the surface 30 of a relatively rigid backing 20, such surface 30 being painted, coated or otherwise finished so as to be relatively flat, smooth, and non-porous. The backing for the antigen shapes should be sufficiently large, especially around the binding site, to permit a completed antibody 40 to be placed thereon in order to determine whether the antibody's binding region 50 matches the antigen's binding site 60. One advantage of this embodiment is that the variable region pairs (i.e. the matching LV pieces and the matching HV pieces) can be conveniently stuck together when the kit is being stored so that they may be more easily located when needed to complete an exercise.

Teaching Exercises

The materials in the kit of the present invention provide students with the opportunity to explore antibody structure and function in a hands-on laboratory exercise. This is an inquiry based activity. Using the kit materials, students may work individually or in groups (preferably groups of four) to construct one or more unique antibodies (preferably at least one antibody per student). As described above, a variety of antibodies are constructed by attaching the various variable region pairs to their corresponding chains in the constant regions, i.e., LV to LC and HV to HC. The antibodies thus constructed are then compared to one or more antigen shapes to determine whether any of the antibody binding regions match any of the antigen binding sites. Preferably, the teacher will provide each group with only one antigen (either pre-cut or to be cut out) after they have constructed the various antibodies, which antigen will fit only one of the antibodies. On a representative level, this one antibody, when complexed with the antigen, has become activated.

Those skilled in the art will appreciate that many variations of the forgoing approach may be employed to demonstrate various aspects of the structural/functional relationship of the antibody/antigen binding process, as well as more general aspects of the immune system. Such approaches will preferably be described in written materials included in the kit. An example of the text of a teacher's guide that would accompany the kit is provided in Example 1, below.

EXAMPLE 1

The following instructional text for teachers may be included in the kit of the present invention.

"PROCEDURE:

To begin this hands-on laboratory exercise, have students work in groups of four. Each group should receive an Antibody Kit, tape, and scissors. Each student should cut out one constant region. Have them use the key to identify the important structures.

Students should then choose one matching pair of Heavy Chain Variable Regions (HV) and one matching pair of Light Chain Variable Regions (LV) to work with. These model pieces will be used to construct the completed antibody. The following key identifies each of the model pieces:

FC=Common Fragment or Crystallizable Fragment
HC=Heavy chain Constant Region
HV=Heavy Chain Variable Region
LC=Light Chain Constant Region
LV=Light Chain Variable Region Each student in the group should select a combination of heavy and light chain variable regions different from the other group members. These combinations effectively simulate the result of complex genetic processes that occur in an antibody producing B-cell during differentiation.

Once students have cut out their variable regions, have them align each with the corresponding Heavy Chain Constant Regions along the dotted lines. Students should then fasten the pieces with tape. Each completed antibody model matches one of the different antigens provided. Remind students that it is the rearrangement of variable regions with the constant regions that yields a unique antibody.

Next, provide each group with one of the antigens to cut out. Ask students to test their antibodies against this antigen and describe the results. You may wish to have students refer to a diagram of a matching antibody-antigen model while doing this activity. A matching antibody-antigen model should look like the example given in FIG. 1 below [not shown, but would correspond to FIG. 3A].

The antibody that matches the antigen provided by the teacher simulates the antibody that would be expanded during an immune response. You may wish to describe in more detail the process by which this antibody undergoes selection and amplification.

OPTIONAL ACTIVITIES:

The materials in this kit may be used to demonstrate the protective effects of immunization. After the initial exercise, students might be directed to construct antibodies identical to the one that was activated. The teacher can then "challenge" the immune system again with multiple copies of the antigen that triggered the immune response. The students will see that this secondary immune response is faster and directly against the invader.

The materials in this kit may also be used to simulate what happens to an immune response when changes occur in the antigen (antigenic shift). To do this, allow students to finish their antibody-antigen models a described. Then, replace their original antigen with a different antigen provided. Ask the students to discuss the significance of this change in relation to human disease.

Abnormalities in antibody structure may be simulated by altering antibody assembly. For example, one set of variable regions may be deleted from the finished antibody model. Have students predict the effect of this defect on the cellular immune response.

APPLICATION EXERCISES:

Introduce and define the following terms generated from this lesson if you have not already done so: antibody diversity, heavy chain, light chains, B cell, variable region, and constant region.

You may wish to continue your discussion with open ended questions or activities that allow application of the concepts introduced here. For example, you may wish to initiate a class discussion or assign supplemental reading.

You may also wish to assign questions from the Application Exercises section provided in the Student Guide.

Have students use a reference book or the internet to find out about specific types of antibodies. Have them report their findings to the class.

Ask what other questions this activity has brought to mind."

It will be appreciated that similar instructions, designed for students rather than teachers, may also be included in the kit as hand-outs.

The teaching aid and methods disclosed herein may be made and implemented without undue experimentation in light of such disclosure. While the aids and methods of the present invention have been described in terms of preferred embodiments, it will be apparent to those skilled in the art that variations may be applied to the aid and teaching methods described herein without departing from the concept, spirit and scope of the present invention. All substitutes and modifications apparent to those skilled in the art are deemed to be within such concept, spirit and scope of the invention as defined by the following claims.

REFERENCES

Abbas, A., Lichtman, A. & Pober, J. (1994). Cellular and molecular immunology 2nd ed. New York: W. B. Sanders.

Amit, A. G., Marluzza, R. A. & Phillips, S. E. V. (1986). Three-dimensional structure of an antigen-antibody complex at 2.8 A resolution. Science, 233, 747–753.

Audesirk, T., Audesirk, G. (1993). Biology: life on earth (fourth edition). Upper Saddle River: Prentice Hall.

Benjamini, E. & Leskowitz, S., (1992). Immunology, a short course, second edition). New York: Wiley-Liss.

Campbell, N. (1993). Biology (third edition). Redwood City: Benjamin Cummings.

Gould, J. & Keeton, W. (1996). Biological science (sixth edition). New York: W. W. Norton.

Milstein, C. (1986). From antibody structure to immunological diversification of immune response. Science, 231, 1261–268.

Raven, P. & Johnson, G. (1996). Biology (fourth edition). Dubuque: Wm. C. Brown.

I claim:

1. A teaching aid to facilitate the teaching of students about antibodies and antigens, comprising an antibody model and an antigen model, wherein:

the antibody model comprises i) a Y-shaped constant region having a stalk and two branches, wherein the two branches are comprised of a pair of heavy chain constant regions (HC), and a pair of light chain constant regions (LC); and ii) a plurality of pairs of variable region shapes, where the individual members of each pair of variable region shapes are mirror images of each other and are adapted to extendibly connect to the branches of the Y-shaped constant region to permit the formation of plurality of differently shaped binding regions; and the antigen model comprises an antigen shape having a peripheral binding site that corresponds to at least one of the plurality of differently shaped binding regions of the antibody model, so as to permit the antigen model and the antibody model to fit together in a manner representative of an antigen/antibody complex.

2. The teaching aid of claim 1, wherein the plurality of pairs of variable region shapes comprises at least three pair of variable region shapes, and wherein each pair of variable region shapes is either a pair of light chain variable region shapes (LV) or a pair of heavy chain variable region shapes (HV), which correspond to the LC and the HC, respectively.

3. The teaching aid of claim 2, wherein the antibody model and the antigen model are physical models and the correspondence of LV to LC and HV to HC is effected by common coloration or marking.

4. The teaching aid of claim 3, further comprising written instructions and attachment means to removably connect LV to LC and to removably connect HV to HC.

5. The teaching aid of claim 3, wherein the Y-shaped constant region, the variable region shapes, and the antigen shaped are all pre-cut.

6. A method of teaching, comprising the use of a teaching aid, which comprises an antibody model and an antigen model, wherein:

the antibody model comprises:
  i) a Y-shaped constant region having a stalk and two branches, wherein the two branches are comprised of a pair of heavy chain constant regions (HC), and a pair of light chain constant regions (LC); and
  ii) a plurality of pairs of variable region shapes, where the individual members of each pair of variable region shapes are mirror images of each other and are adapted to extendibly connect to the branches of the Y-shaped constant region to permit the formation of a plurality of differently shaped binding regions; and the antigen model comprises an antigen shape having a peripheral binding site that corresponds to a least one of the plurality of differently shaped binding regions of the antibody model, so as to permit the antigen model and the antibody model to fit together in a manner representative of an antigen/antibody complex;

to teach students about antibodies and antigens.

7. The method of claim 6, wherein the teaching aid is the teaching aid of claim 10, and wherein the use of such teaching aid is in a hands-on classroom or laboratory exercise.

\* \* \* \* \*